Figure 1:
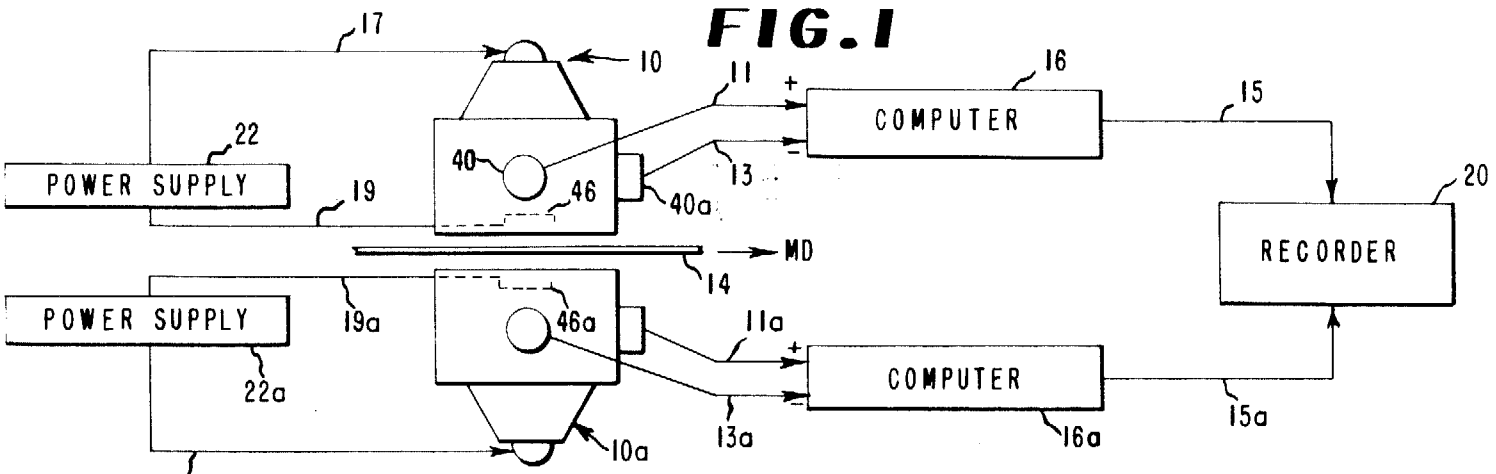
Figure 2:
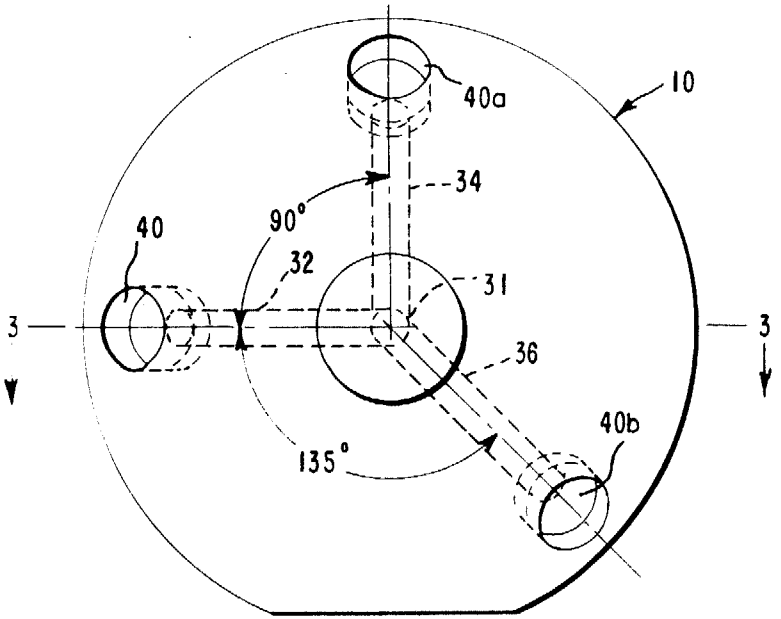
Figure 3:
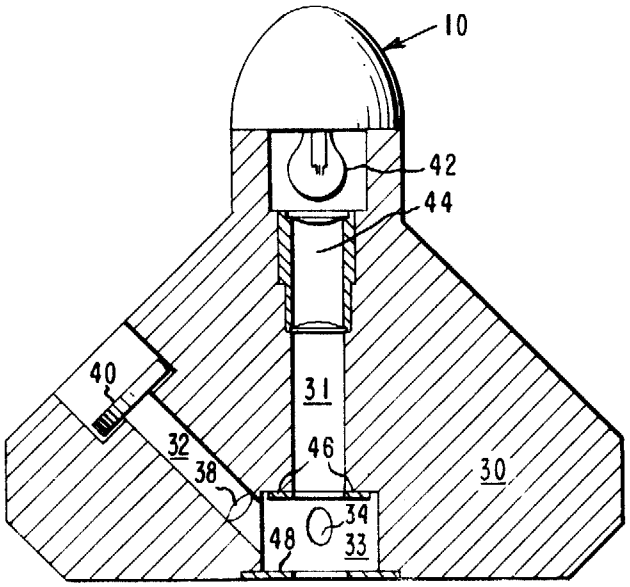
Figure 4:
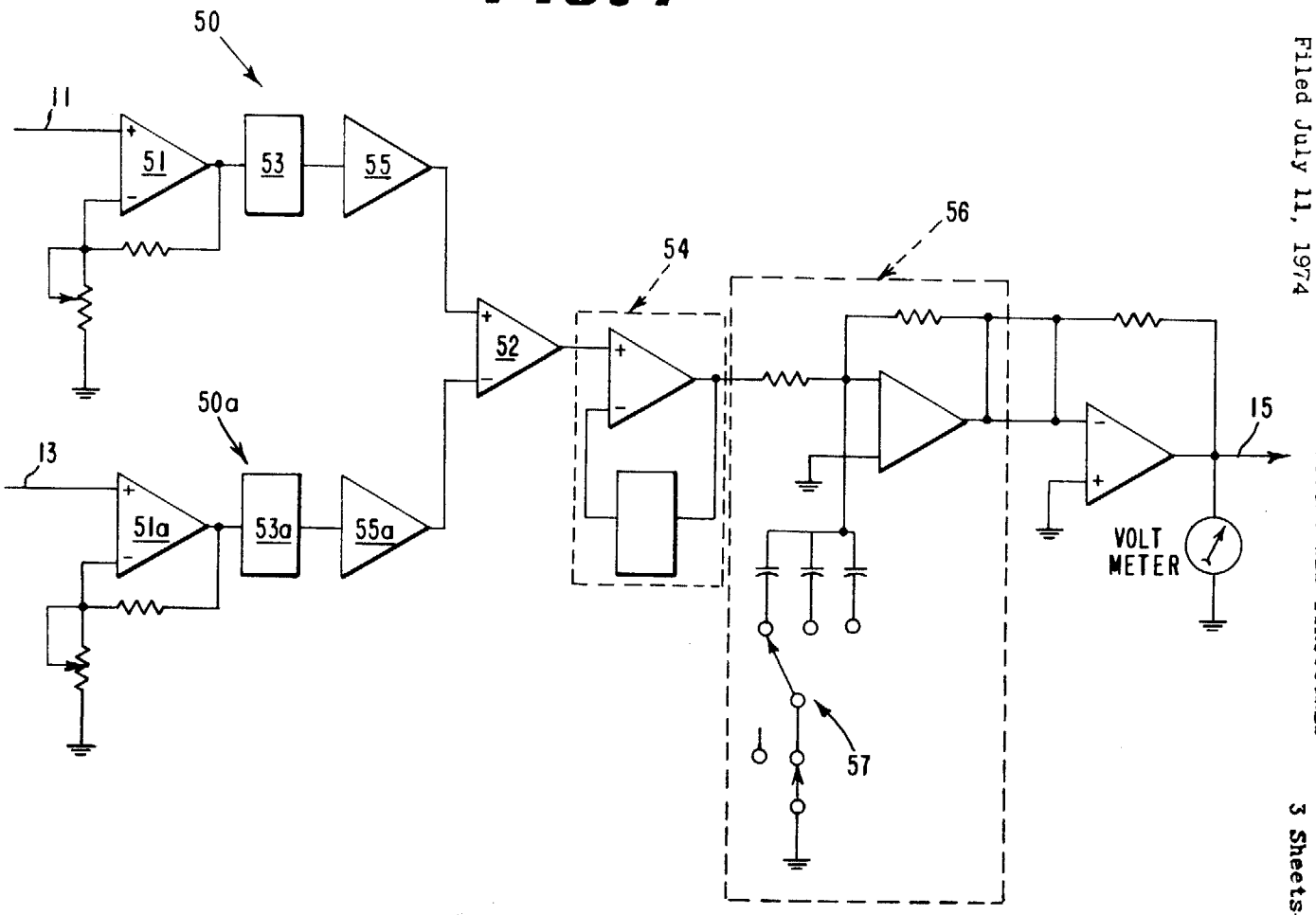
Figure 5:
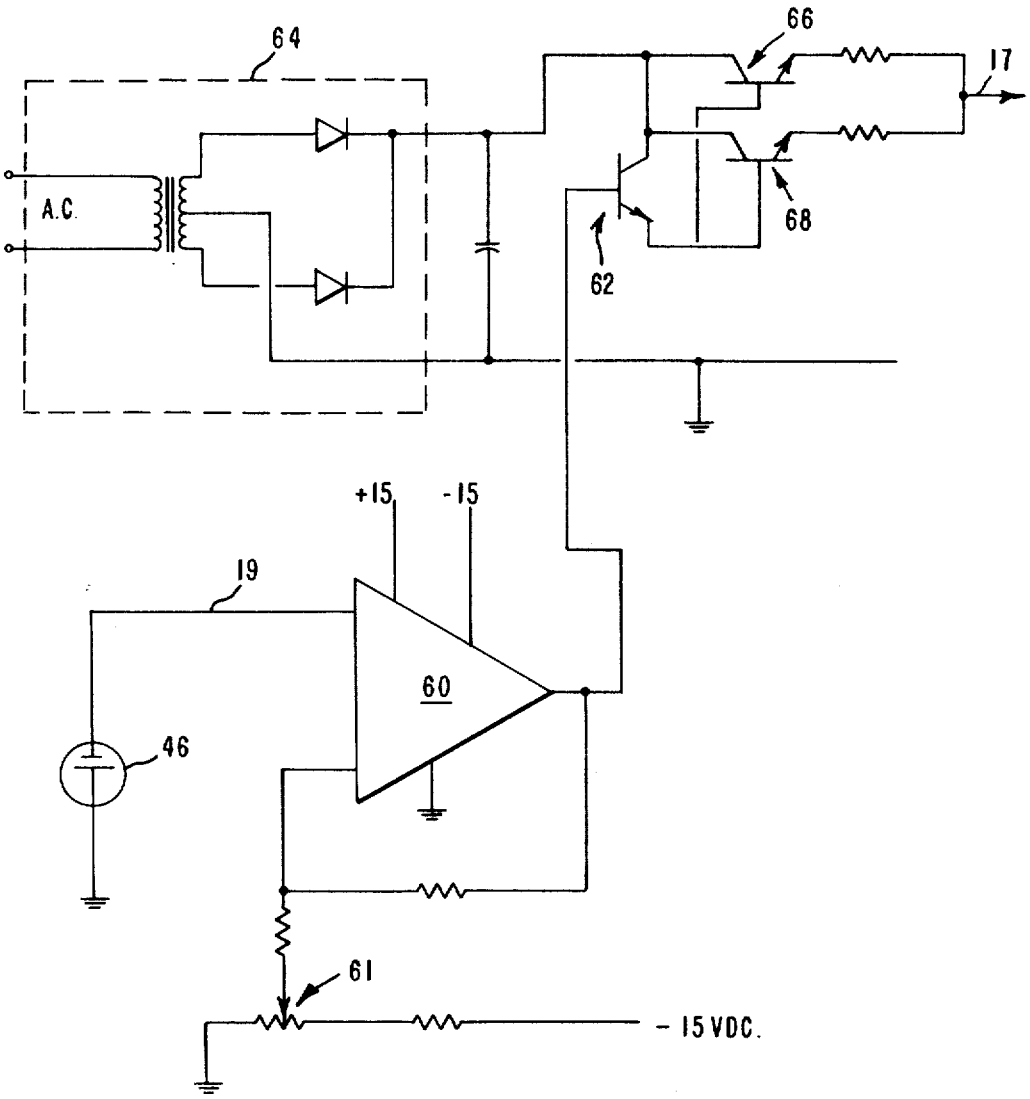

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 11

T932,008

APPARATUS FOR DETERMINING FIBER DIRECTIONALITY IN MOVING WEB STRUCTURES

Latham S. Davis, 700 Minor Terrace, Winter Haven, Fla. 33880, and Richard A. Satterfield, 307 Shevel Drive, Goodlettsville, Tenn. 37072

Filed July 11, 1974, Ser. No. 487,816
Int. Cl. G01n *21/30*
U.S. Cl. 250—571
3 Sheets Drawing. 8 Pages Specification

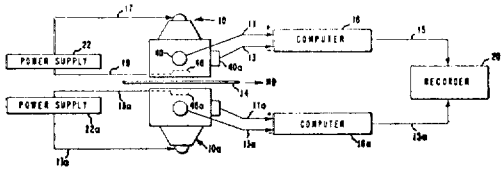

An apparatus to determine fiber directionality in moving web structures. The apparatus uses a fiber property of directional reflectance of collimated light to establish fiber position (direction). Collimated light is projected onto a web surface and the scattered reflected light is sensed by multiple optical sensors. Since light is reflected greatest perpendicular to the direction of the fiber axis, a measure of overall fiber directionality is obtained by comparing the pickup of strategically placed photo sensors. The apparatus includes three sections: scanning heads for monitoring upper and lower web surfaces; electronic circuits to compare the signal outputs of the photo sensors in the scanning heads to obtain related values of fiber directionality; and a controlled power supply and illumination source. The degree of illumination is controlled by the general brightness of the material being measured so that a constant level of reflectance is maintained.

RECORDER
COMPUTER
COMPUTER
POWER SUPPLY
POWER SUPPLY
MD

90°
135°